United States Patent [19]

Westerman

[11] 4,062,817
[45] Dec. 13, 1977

[54] WATER ABSORBENT POLYMERS COMPRISING UNSATURATED CARBOXYLIC ACID, ACRYLIC ESTER CONTAINING ALKYL GROUP 10-30 CARBON ATOMS, AND ANOTHER ACRYLIC ESTER CONTAINING ALKYL GROUP 2-8 CARBON ATOMS

[75] Inventor: Ira John Westerman, Strongsville, Ohio

[73] Assignee: The B. F. Goodrich Company, Akron, Ohio

[21] Appl. No.: 784,099

[22] Filed: Apr. 4, 1977

[51] Int. Cl.² .................. C08L 5/00; C08F 218/02; C08F 218/14
[52] U.S. Cl. .................. 260/17.45 G; 526/15; 526/16; 526/47; 526/49; 526/206; 526/271; 526/317
[58] Field of Search .............. 260/17.45 G; 526/271, 526/317, 15, 16, 49, 206, 47

[56] References Cited
U.S. PATENT DOCUMENTS

| | | | |
|---|---|---|---|
| 2,790,736 | 4/1957 | McLaughlin et al. | 526/317 |
| 2,892,788 | 6/1959 | Stewart et al. | 526/317 |
| 2,892,791 | 6/1959 | Lowe et al. | 526/317 |
| 2,892,792 | 6/1959 | Stewart et al. | 526/317 |
| 3,194,777 | 7/1965 | Christenson et al. | 526/317 |
| 3,317,493 | 5/1967 | Selby | 526/317 |
| 3,575,911 | 4/1971 | Peterson | 526/317 |
| 3,577,517 | 5/1971 | Kubot et al. | 526/317 |
| 3,657,175 | 4/1972 | Zimmerman | 526/317 |
| 3,915,921 | 10/1975 | Schlatzer | 260/17.45 G |
| 3,940,351 | 2/1976 | Schlatzer | 260/17.45 G |
| 3,954,898 | 5/1976 | Hirota et al. | 526/317 |
| 3,957,740 | 5/1976 | Blank et al. | 526/16 |
| 3,966,687 | 6/1976 | Ribba | 526/317 |
| 3,970,633 | 7/1976 | Miller et al. | 526/47 |

*Primary Examiner*—Herbert J. Lilling
*Attorney, Agent, or Firm*—J. Hughes Powell, Jr.

[57] ABSTRACT

Polymers of unsaturated copolymerizable carboxylic acids, at least one acrylic or methacrylic ester containing an alkyl of 10 to 30 carbon atoms, and another acrylic or methacrylic ester containing and alkyl of 1 to 8 carbon atoms, optionally with a small amount of a cross-linking agent, rapidly absorb and retain large quantities of water and ionic fluids, and are useful in disposable nonwoven articles.

19 Claims, No Drawings

WATER ABSORBENT POLYMERS COMPRISING UNSATURATED CARBOXYLIC ACID, ACRYLIC ESTER CONTAINING ALKYL GROUP 10-30 CARBON ATOMS, AND ANOTHER ACRYLIC ESTER CONTAINING ALKYL GROUP 2-8 CARBON ATOMS

BACKGROUND OF THE INVENTION

U.S. Pat. No. 3,915,921 discloses copolymers of unsaturated carboxylic acid monomers with an alkyl acrylate ester wherein the alkyl group contains about 10 to 30 carbon atoms that are efficient water thickeners, which when neutralized by basic materials have improved resistance to loss in viscosity, even in the presence of substantial amounts of inorganic salts such as sodium chloride. These copolymers absorb water, but copolymers having improved rates of water absorption and retention are desired.

SUMMARY OF THE INVENTION

Copolymers of about 40 to 87 weight percent of unsaturated copolymerizable carboxylic acid monomers, about 2 to about 20 weight percent of at least one acrylic or methacrylic acid ester wherein an alkyl group contains 10 to 30 carbon atoms and about 5 to 30 weight percent of at least one acrylic or methacrylic acid ester wherein an alkyl group contains 1 to 8 carbon atoms, optionally with a small amount of a cross-linking agent, rapidly absorb and ratain large quantities of water and also absorb and retain ionic aqueous fluids.

DETAILED DESCRIPTION

The copolymers of carboxylic acid monomer and the two acrylic esters of the types and in the amounts defined hereinafter provide a much faster rate of absorption of water and aqueous ionic fluids than copolymers not containing these essential comonomers in the amounts set forth. The copolymers also demonstrate improved retention of absorbed fluid as compared to prior art polymers. The copolymers are readily prepared by copolymerizing the essential monomers, and optionally other comonomers as defined, by free radical polymerization systems. These copolymers have weight average molecular weights from about 10,000 to greater than 1,000,000. Normally, the molecular weights are from about 50,000 to 900,000. Molecular weights of cross-linked polymers may be higher.

The carboxylic monomers useful in the production of the polymers of this invention are the olefinically-unsaturated carboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group thusly,

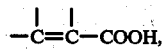

or as a part of a terminal methylene grouping thusly, $CH_2=C<$ present in the copolymer in amounts from about 40 to 87 weight percent of the copolymer. In the alpha-beta acids the close proximity of the strongly polar carboxyl group to the double-bonded carbon atoms has a strong activating influence rendering the substances containing this structure very readily polymerizable. The presence of a terminal methylene grouping in a carboxylic monomer takes this type of command much more easily polymerizable than if the double bond were intermediate in the carbon structure. Olefinically-unsaturated acids of this class include such widely divergent materials as the acrylic acids typified by acrylic acid itself, methacrylic acid, ethacrylic acid, alpha-chloroacrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and the other acid anhydrides useful herein have the general structure

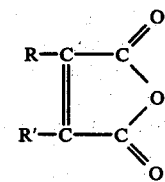

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl and the like.

The preferred carboxylic monomers for use in this invention used in amounts of 40 to 87 weight percent total of the monomers polymerized are the monoolefinic acrylic acids having the general structure

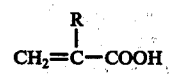

wherein R is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred because of generally lower cost, ready availability, and ability to form superior polymers. Another useful carboxylic monomer is maleic anhydride or the acid.

The preferred acrylic ester monomers having long chain aliphatic groups are derivatives of an acrylic acid represented by the formula

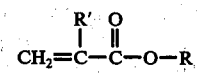

wherein R is an alkyl group having from 10 to 30 carbon atoms, preferably 10 to 20 carbon atoms and R' is hydrogen or a methyl or ethyl group present in the copolymer in amount from about 2 to 20 weight percent, more preferably, about 5 to 15 weight percent. Representative higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers to provide useful thickening resins of this invention. Particularly useful are those methacrylates where the alkyl group contains 16 to 21 carbon atoms present in amounts of about 5 to 15 weight percent of the total monomers. Outstanding polymers have been made with 15±5 weight percent isodecyl methacrylate, 10±3 weight percent lauryl methacrylate, 7±3 weight percent stearyl methacrylate.

The other essential acrylic esters are also derivatives of an acrylic acid used in amounts of about 5 to 30 weight percent represented by the formula

wherein R is an alkyl, alkoxy, haloalkyl, cyanoalkyl, and like groups having from 1 to 8 carbon atoms and R' is hydrogen or a methyl or ethyl group. These acrylic esters are present in the copolymer in amount from about 5 to 30 weight percent and more preferably from about 5 to 25 weight percent. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, and the like.

The preferred cross-linking monomer for use in preparing the copolymers, if one is employed, is a polyalkenyl polyether having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 4 carbon atoms and at least 3 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include for example, diallyl esters, dimethallyl ethers, allyl or methallyl acrylates and acrylamides, tetraallyl tin, tetravinyl silane, polyalkenyl methanes, diacrylates and dimethacrylates, divinyl compounds as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, pentaerythritol triacrylate, tetramethylene dimethacrylate, tetramethylene diacrylate, ethylene diacrylate, ethylene dimethacrylate, triethylene glycol dimethacrylate, and the like. Allyl pentaerythritol and allyl sucrose provide excellent polymers in amounts less than 0.5 weight percent.

Cross-linking of the polymers provides improved ability for the copolymers to swell under a confining pressure.

When the optical cross-linking agent is present, polymeric mixtures containing about 0 to about 3% by weight of cross-linking monomer based on the total of carboxylic acid monomer plus the alkyl acrylate ester monomers, and more preferably, 0.1 to 0.5 weight percent or phm.

Another method to obtain the desired cross-linking is to use a comonomer which can react to yield cross-links during polymerization. Examples are 2-hydroxyethyl methacrylate and hydroxypropyl methacrylate, and the like. These units, when copolymerized, cross-link by interchain esterification with carboxylic groups. For 2-hydroxyethyl methacrylate, about 1 to 7 weight percent of monomers based in the total weight of monomers will provide a desired degree of cross-linking.

Another method of obtaining cross-linked polymers is by reacting small amounts of a polyvalent base with the carboxyl-containing polymer. Those materials which yield multivalent cations, for example, include calcium, magnesiun, zinc, and aluminum. A mixed salt to be used would be one containing potassium or sodium ions with small amounts of calcium or aluminum ions, for example, to provide the multivalent cation to provide cross-linking through polymeric carboxyl groups.

It will also be understood that small amounts of other vinylidene monomers, that is, those copolymerizable monomers containing at least one terminal $CH_2<$ group may also be included as a copolymerizable monomer with the essential monomers so long as such monomers do not adversely affect the desired balance of water absorption and retention of the polymeric materials. Such materials include vinyl acetate, vinyl pyrrolidone, methyl vinyl ether, ethyl vinyl ether, methyl vinyl ketone and like in amounts less than about 10 weight percent of the polymer, normally less than 5 weight percent.

The polymers of this invention are preferably made by polymerization in an inert diluent having some solubilizing action on one or more of the monomeric ingredients but substantially none on the resultant polymer. Polymerization in mass may be employed but is not preferred because of the difficulty in working up the solid polymeric masses obtained. Polymerization in an aqueous medium containing a water-soluble free radical catalyst peroxygen is useful. Polymerization in an organic liquid which is a solvent for the monomers but a non-solvent for the polymer, or in a mixture of such solvents, in the presence of a solvent-soluble catalyst is most preferred because the product is usually obtained as a very fine friable and often fluffy precipitate which, after solvent removal, seldom requires grinding or other treatment before use. Suitable solvents for the latter method include benzene, xylene, tetralin, hexane, heptane, carbon tetrachloride, methyl chloride, ethyl chloride, bromo trichloro methane, dimethyl carbonate, diethyl carbonate, ethylene dichloride, and mixtures of these and other solvents.

The polymerizations desirably are conducted in the presence of a haloethane or halomethane, preferably containing at least four halogen atoms. Representative materials include for example, a fluoroethane, fluoromethane, chlorofluoromethane, bromofluoroethane, or preferably a chlorofluoroethane or chlorofluoromethane containing at least four halogen atoms including, for example, 1,1,2-trichloro-1,2,2-trifluoroethane, trichlorofluoromethane, tetrafluoromethane, chlorotrifluoromethane, bromotrifluoromethane, 1-chloro-1,1,2,2,2-pentafluoroethane, dichlorodifluoromethane, 1,2-difluoro-1,1,2,2-tetrachloroethane and the like. The amounts of these materials used may be varied from the amount just sufficient to make a slurry of the reactants up to where there is a substantial excess of the chlorofluoroethane, as will be apparent to those skilled in the art. Preferred diluents are those which are solvents for the monomers but nonsolvents for the polymers.

Polymerization in the diluent medium is carried out in the presence of a free radical catalyst in a closed vessel in an inert atmosphere and under autogenous pressure or articifically-induced pressure or in an open vessel under reflux at atmospheric pressure. Temperature of the polymerization may be varied from 0° to 100° C., depending to a large degree on the molecular weight desired in the polymer. Polymerization under reflux at 50° to 90° C. under atmospheric pressure using a free radical catalyst is generally effective in bringing a polymer yield of 75% to 100% in less than 10 hours. Suitable catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like as well as azo diisobutyryl nitrile, hereinafter referred to as azoisobutyronitrile. Other catalysts utilizable are the so-called "redox" type of catalyst and the heavy-metal activated catalyst systems.

These polymers generally do not attain their maximum properties until converted to a partial alkali, ammonium or amine salt. The neutralizing agent is preferably a monovalent alkali such as sodium, potassium, lithium or ammonium hydroxide or the carbonates and bicarbonates thereof, or mixtures of the same, and also amine bases having not more than one primary or secondary amino group. Such amines include, for example, triethanolamine, ethanolamine, isopropanolamine, triethylamine, trimethyl amine, and the like.

At least 30% of the acid, carboxyl, groups are neutralized to an ionic state, that is, $-CO_2^- M^+$. Preferably, about 50 to 90 weight percent of the acid groups are neutralized to $-CO_2M$. The counter ion $M^+$ is the alkali cation $Li^+$, $K^+$, the ammonia ion $NH_4^+$ or quaternary cationic compounds resulting from the neutralization with an organic amine. Excellent results have been obtained with $Na^+$ and $K^+$. Neutralization with triethanolamine has been particularly useful.

As water absorbent materials these polymers find many uses in powder, lump, film, fiber, fabric form and like form. They are of particular utility in the disposable nonwoven industry where there is need for polymers which will absorb and retain water and ionic physiological fluids. An important feature of these polymers is their enhanced thickening property even in the presence of a salt. Specific applications include disposable diapers, medical-surgical supplies and personal care products. Such applications require a polymer which must imbibe the liquid to be absorbed rapidly and be a polymer that will not dissolve. Further, the fluid must be immobilized or congealed in some way to be retained. The materials may also be used as suitable additives to greatly increase the absorptive power of conventional absorbents such as cotton, wood pulp and other cellulosic absorbents used in applications such as wiping cloths, surgical sponges, catamenial devices, and the like. In a specific application, for example, a disposable diaper, there is an inner layer of a soft absorbent nonwoven material that absorbs and passes urine to an inner layer of fluffy fibrous absorbent material, wherein during the construction of this nonwoven fiber agglomerates or fibers of the polymers of this invention may be included and an additional impervious plastic layer, as polyethylene. A film of the copolymers of this invention may be used between the outer plastic layer and the inner fluffy absorbent layer. Use of the polymers of this invention can result in reduction in the bulk size of many disposable nonwovens.

The test for absorbency involves enclosing a weighed polymeric sample within a sewn strip of cheesecloth, the assembly resembling a tea bag. In order to determine the amount of fluid absorbed, a blank cheesecloth bag not containing polymer is treated identically. Both the blank and polymer containing samples are immersed in the fluid, drained for a definite time and weighed. From the weights of the blank and sample after each immersion, the amount of fluid absorbed in a specific time is readily calculated. Powders, fibers, thin films and granules may be tested in this manner. Sample films are cast from a 1% aqueous mucilage of alkali neutralized polymers, and for the Examples a 15 gram sample of a 1% mucilage is placed in an aluminum foil cup 5 cc in diameter and dried at atmospheric pressure at 80° C. Cheesecloth bags were prepared from 15 cm sq. of cheesecloth folded over and sewn with thread. Samples were placed in the fluid to be absorbed for periods indicated in the data tables with 15 minutes drawing time between each immersion.

The polymers are readily prepared with lauroyl peroxide, t-butyl peroxy pivalate, azoisobutyronitrile and the like in a solvent for the monomer/nonsolvent for the copolymer. The polymers were prepared in batch polymerization at 65° C. in 1,1,2-trichloro-1,2,2-trifluoroethane (Freon 113) as the solvent at 65° C. using caprylyl peroxide as the catalyst. The resulting polymers were isolated and dried for 15 to 20 hours in a vacuum oven at 60° C. The ionic fluid was simulated urine prepared from 97.09 weight percent water, 1.49 weight percent urea, 0.80 weight percent sodium chloride, 0.11 weight percent $MgSO_4 \cdot H_2O$ and 0.06 weight percent $CaCl_2$.

EXAMPLE I

A polymer sample (A) was prepared from 62.4 weight parts acrylic acid, 12.0 weight parts methyl methacrylate (MMA) and 5.06 weight parts lauryl methacrylate in 675 weight parts of Freon 113 in the presence of 15 ml of caprylyl peroxide (1% solution in Freon 113). A sample of this polymer was tested for water and ionic fluid absorbency in comparison with a copolymer (B) containing only acrylic acid and lauryl methacrylate, containing 93 weight parts of acrylic acid and 7 weight parts lauryl methacrylate per 100 weight parts of copolymer. The results obtained and the times of immersion are set forth hereinbelow. The absorbed fluid being expressed as fluid/polymer weight ratio.

| Total Time of Immersion | Distilled Water | | Synthetic Urine | |
|---|---|---|---|---|
| Seconds | A(MMA) | B | A(MMA) | B |
| 15 | 86.3 | 13.6 | 24.5 | 14.5 |
| 30 | 116.4 | 25.6 | 26.5 | 24.4 |
| 90 | 174.3 | 46.8 | 32.4 | 35.4 |

These data clearly demonstrate the tremendous and unexpected increase in water absorbency of the three-component terpolymers A containing methyl methacrylate substituted in part for the acrylic acid, as compared to the copolymer B not containing methyl methacrylate. In the absorption of synthetic urine, note the enhanced absorption rate at 15 seconds of copolymer A of this invention as compared to the copolymer B not containing methyl methacrylate. The important factor is a rapid rate of absorption.

EXAMPLE II

In this Example a series of copolymers were made with increasing amounts of methyl methacrylate to demonstrate the enhanced absorption of water with increasing amounts of methyl methacrylate reported as amount of water absorbed times the weight of polymer. The polymers were prepared as described in Example I. All of the polymers were prepared with 7 weight percent of lauryl methacrylate; 0, 10, 15 and 20 weight percent methyl methacrylate, and 93, 83, 78 and 73 weight percent acrylic acid. The fluid/polymer ratio data obtained is as follows:

| Total Immersion Time - Seconds | Weight % MMA | | | |
|---|---|---|---|---|
| | 0 | 10 | 15 | 20 |
| 15 | 13.6 | 27.1 | 86.3 | 92.1 |
| 30 | 25.6 | 34.8 | 116.4 | 131.1 |
| 45 | 33.3 | 39.8 | 128.6 | 143.2 |
| 60 | 40.4 | 61.5 | 141.6 | 150.4 |
| 90 | 46.8 | 70.7 | 174.3 | 163.5 |

The unexpected increase in amount of water absorbed as the methyl methacrylate in the copolymer is increased and the acrylic acid is decreased is readily apparent from these data. A further advantage of the copolymers containing increasing amounts of methyl methacrylate is the enhanced film-forming capabilities of such polymers.

EXAMPLE III

This Example demonstrates the effect of lauryl methacrylate on water absorbency of a polymer containing a constant amount, 15 weight percent, methyl methacrylate. These polymers contained 0, 7 and 25 weight percent lauryl methacrylate, 15 weight percent methyl methacrylate and 85, 78, and 60 weight percent acrylic acid.

| Weight % LMA | 0 | 7 | 25 |
|---|---|---|---|
| Total Immersion Seconds | | Fluid/Polymer | |
| 15 | 0 | 50.0 | 5.1 |
| 30 | 0 | 74.7 | 13.0 |
| 45 | 0 | 91.0 | 21.5 |
| 60 | 0 | 106.6 | 30.6 |
| 90 | 0 | 121.9 | 37.4 |
| 120 | 0 | 134.7 | 44.1 |
| 150 | 0 | 146.4 | 49.8 |
| 180 | 0 | 157.2 | 57.2 |

It should be noted that the polymer containing 0 weight percent lauryl methacrylate did not absorb its own weight in water, as compared with 50 times its own weight absorbency with a polymer containing only 7% lauryl methacrylate. The decreased absorbency of lauryl methacrylate as the lauryl methacrylate content of the polymer increased is demonstrated by the 25 weight percent polymer.

EXAMPLE IV

The absorbency characteristics in both water and synthetic urine of copolymers containing lauryl methacrylate and stearyl methacrylate are demonstrated in this example. The two copolymers prepared as described each contained 83 weight percent acrylic acid, 10 weight percent methyl methacrylate and 7 weight percent lauryl methacrylate or stearyl methacrylate. The weight absorption data obtained are as follows:

| Total Immersion-Seconds | Distilled Water | | Synthetic Urine | |
|---|---|---|---|---|
| | LMA | SMA | LMA | SMA |
| | Fluid/Polymer | | | |
| 15 | 27.1 | 29.6 | 20.7 | 16.1 |
| 30 | 34.8 | 46.5 | 25.5 | 31.9 |
| 45 | 39.8 | 55.1 | 32.5 | 37.6 |
| 60 | 61.5 | 69.7 | 35.9 | 40.3 |
| 90 | 70.7 | 78.7 | 39.0 | 43.6 |
| 120 | 55.5 | 85.8 | 41.0 | 43.6 |
| 150 | — | 90.3 | 43.7 | 44.1 |
| 180 | 61.9 | 94.1 | 44.9 | 41.3 |

EXAMPLE V

To demonstrate the effect of cross-linking on the water absorbent characteristics of these polymers, two polymers were prepared: one (MMA) containing 7 weight percent lauryl methacrylate, 10 weight percent methyl methacrylate, 83 weight percent acrylic acid; and the other (EA) 7 weight percent lauryl methacrylate, 15 weight percent ethyl acrylate and 78 weight percent acrylic acid. Each was cross-linked with the amount of allyl pentaerythritol (APE) indicated in the data table I below being present during the copolymerization reaction.

DATA TABLE I

| APE - Phm | MMA Polymer | | | EA Polymer | | |
|---|---|---|---|---|---|---|
| | 0.00 | 0.05 | 0.20 | 0.00 | 0.20 | 1.00 |
| Total Immersion Seconds | Fluid/Polymer Weight Ratio | | | | | |
| 15 | 27.1 | 53.9 | 26.6 | 61.7 | 54.3 | 4.8 |
| 30 | 34.8 | 131.0 | 49.0 | 69.8 | 114.9 | 25.0 |
| 45 | 39.8 | 185.6 | 62.6 | 77.1 | 159.2 | 52.2 |
| 60 | 61.5 | 224.0 | 74.3 | 83.3 | 192.3 | 79.8 |
| 90 | 70.7 | 256.4 | 86.6 | 90.2 | 222.1 | 115.8 |
| 120 | 55.4 | 280.5 | 94.6 | 98.3 | 245.1 | 144.7 |
| 150 | — | 295.7 | 104.3 | 105.4 | 263.2 | 176.5 |
| 180 | 61.9 | 305.9 | 115.6 | 115.2 | 278.4 | 198.3 |

It is noted that better absorbency for water is obtained with these two copolymers when the allyl pentaerythritol is present in amounts of less than one part per hundred of other monomers, although the polymers containing one phm has increased absorbency.

EXAMPLE IV

Two other polymers were prepared as described above, each containing 78 weight percent acrylic acid, 15 weight percent ethyl acrylate and 0.2 parts per hundred of total monomers of allyl pentaerythritol, and one polymer (LMA) 7 weight percent lauryl methacrylate and the other (IDMA) 7 weight percent isodecyl methacrylate.

| Total Immersion-Seconds | Distilled Water | | Synthetic Urine | |
|---|---|---|---|---|
| | LMA | IDMA | LMA | IDMA |
| | Fluid/Polymer | | | |
| 15 | 54.3 | 49.8 | 15.0 | 8.1 |
| 30 | 114.9 | 112.5 | 23.9 | 14.9 |
| 45 | 159.2 | 162.0 | 25.8 | 20.5 |

-continued

| Total Immersion-Seconds | Distilled Water | | Synthetic Urine | |
|---|---|---|---|---|
| | LMA | IDMA | LMA | IDMA |
| | Fluid/Polymer | | | |
| 60 | 192.3 | 196.4 | 27.1 | 25.3 |
| 90 | 222.1 | 226.8 | 26.7 | 28.0 |
| 120 | 245.1 | 252.3 | 27.0 | 30.5 |
| 150 | 263.2 | 269.5 | 27.3 | 33.0 |
| 180 | 278.4 | 287.6 | 26.9 | 34.4 |

EXAMPLE VII

A polymer was prepared as described above containing methacrylic acid instead of acrylic acid. The copolymer was a copolymer of 80 weight percent methacrylic acid, 5 weight percent stearyl methacrylate and 15 weight percent methyl methacrylate. The polymer was neutralized with potassium hydroxide to form the potassium salt and cast into film from the aqueous solution. A 0.16 film was tested for weight absorbency in distilled water. The absorption data was 24.4 times its own weight at 15 seconds, 51.1 at 30 seconds and 60.8 at 45 seconds. More striking was the absorption of simulated urine, 19.9 at 15 seconds, 28.2 at 30 seconds and 30.6 at 45 seconds used in 0.2 gram weight of film.

EXAMPLE VIII

To demonstrate the utility of other lower alkyl acrylates and methacrylates a series of polymers were prepared with 80 weight percent acrylic acid, 5 weight percent stearyl methacrylate and 15 weight percent of the monomers indicated in the data table. The polymers were converted to the potassium salt, films cast and absorbency in distilled water reported as weight of water absorbed per weight of polymer.

DATA TABLE II

| Monomers Time Seconds | N-hexyl methacrylate | N-octyl acrylate | 2-ethylhexyl methacrylate | Isopropyl methacrylate | Methyl methacrylate |
|---|---|---|---|---|---|
| | Fluid/Polymer | | | | |
| 15 | 37.5 | 38.0 | 28.6 | 40.0 | 48.3 |
| 30 | 86.9 | 87.6 | 60.2 | 74.5 | 84.6 |
| 45 | 116.5 | 115.9 | 79.5 | 86.4 | 109.4 |
| 60 | 134.6 | 138.0 | 93.2 | 96.5 | 141.4 |
| 90 | 157.6 | 156.3 | 105.6 | 103.2 | 166.2 |
| 120 | 173.0 | 174.6 | 115.1 | 108.0 | 176.5 |

These samples were then tested for absorbency in simulated urine with the following results in Data Table III.

DATA TABLE III

| Monomers Time Seconds | N-hexyl methacrylate | N-octyl acrylate | 2-ethylhexyl methacrylate | Isopropyl methacrylate | Methyl methacrylate |
|---|---|---|---|---|---|
| | Fluid/Polymer | | | | |
| 30 | 26.4 | 13.1 | 14.8 | 28.0 | 19.5 |
| 45 | 26.8 | 14.5 | 18.3 | 29.3 | 28.4 |
| 60 | 28.0 | 15.3 | 19.7 | 29.7 | 24.0 |
| 90 | 27.8 | 15.2 | 20.5 | 29.5 | 25.5 |
| 120 | 25.6 | 14.7 | 20.4 | 28.1 | 25.8 |

EXAMPLE IX

Polymers made with 15 weight percent isodecyl methacrylate, 15 weight percent methyl methacrylate and 70 weight percent acrylic acid were prepared as described. The water absorbency of potassium films in distilled water at 15 seconds was 53.5; at 30 seconds, 79.3; at 45 seconds, 96.8; and at 60 seconds, 115.4.

I claim:

1. An interpolymer of monomers comprising from about 40 to 87 weight percent of an olefinically unsaturated carboxylic acid monomer, 2 to 20 weight percent of an (1) acrylic ester monomer of the formula

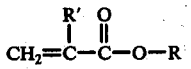

where R' is hydrogen, methyl or ethyl and R contains 10 to 30 carbon atoms and 5 to 30 weight percent of (2) at least one other acrylic ester monomer of the formula

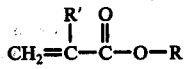

wherein R' is hydrogen, methyl or ethyl and R contains 1 to 9 carbon atoms.

2. An interpolymer of claim 1 containing 0 to 3 weight percent of monomeric cross-linking agent and in (2) wherein R contains 1 to 8 carbon atoms.

3. An interpolymer of claim 2 wherein said carboxylic acid monomer is acrylic acid, (1) is isodecyl methacrylate, lauryl methacrylate or stearyl methacrylate, and (2) is methyl methacrylate or ethyl acrylate.

4. An interpolymer of claim 3 wherein (1) is present in amount from about 5 to 15 weight percent and (2) is present in amount from about 15 to 25 weight percent.

5. An interpolymer of claim 4 wherein the polymer contains about 0.01 to 0.5 weight percent cross-links.

6. An interpolymer of claim 4 wherein at least about 30 weight percent of the COOH acid groups are neutralized to

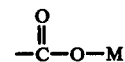

structure wherein M is selected from the group consisting of Li, Na, K and NH₄ ions and quaternary nitrogen compounds, R₃NH.

7. An interpolymer of claim 2 wherein the acid is acrylic acid, methacrylic acid, maleic acid or the anhydrides thereof.

8. An interpolymer of claim 4 wherein the cross-linking monomer contains at least a $CH_2=C<$ grouping and at least one other polymerizable grouping, said polymerizable groupings being unsaturated nonconjugated bonds.

9. An interpolymer of claim 8 wherein said cross-linking monomer is a polyalkenyl polyether of a polyhydric alcohol containing more than one alkenyl ether group per molecule and the parent polyhydric alcohol contains at least 3 hydroxyl groups in amounts of 0.01 to less than 0.5 weight percent of the total monomers.

10. An interpolymer of claim 9 wherein said monomer is allyl pentaerythritol.

11. An interpolymer of claim 9 wherein said monomer is allyl sucrose.

12. An interpolymer of claim 4 wherein there is 7 to 13 weight percent of (1) lauryl methacrylate and (2) is methyl methacrylate.

13. An interpolymer of claim 4 wherein there is 7 to 13 weight percent of (1) stearyl methacrylate and (2) is methyl methacrylate.

14. An interpolymer of claim 9 wherein said acid is acrylic acid, (1) is stearyl methacrylate, (2) is methyl methacrylate and said cross-linking agent is allyl pentaerythritol in amount from 0.05 to 0.2 pHm.

15. An interpolymer of claim 2 wherein (2) is hexyl methacrylate.

16. An interpolymer of claim 2 wherein (2) is octyl acrylate.

17. An interpolymer of claim 2 wherein (2) is 2-ethylhexyl methacrylate.

18. An interpolymer of claim 2 wherein (2) is isopropyl methacrylate.

19. An interpolymer of claim 2 wherein there is 10 to 20 weight percent of (1) isodecyl methacrylate and (2) is methyl methacrylate.

* * * * *